(12) United States Patent
Oh

(10) Patent No.: US 6,874,747 B2
(45) Date of Patent: Apr. 5, 2005

(54) SEAT TRACK FOR VEHICLES

(75) Inventor: Byeong Chan Oh, Cheonan-si (KR)

(73) Assignee: Yoon Young Co., Ltd., Cheonan-si (KR)

( * ) Notice: Subject to any disclaimer, the term of this patent is extended or adjusted under 35 U.S.C. 154(b) by 0 days.

(21) Appl. No.: 10/823,949

(22) Filed: Apr. 13, 2004

(65) Prior Publication Data

US 2004/0222347 A1 Nov. 11, 2004

(30) Foreign Application Priority Data

Apr. 17, 2003 (KR) ................................ 10-2003-0024254

(51) Int. Cl.$^7$ .............................................. F16M 13/00
(52) U.S. Cl. ...................... 248/430; 248/429; 248/424; 297/344.1
(58) Field of Search ................................ 248/430, 429, 248/424; 297/344.1, 340

(56) References Cited

U.S. PATENT DOCUMENTS

| 4,209,159 | A | * | 6/1980 | Becker et al. | .............. | 248/430 |
| 5,048,787 | A | * | 9/1991 | Saitoh | ......................... | 248/430 |
| 5,222,814 | A | | 6/1993 | Boelryk | | |
| 5,567,013 | A | * | 10/1996 | Chang | ......................... | 297/341 |
| 5,575,564 | A | | 11/1996 | Harmon et al. | | |
| 5,918,847 | A | * | 7/1999 | Couasnon | .................... | 248/430 |
| 5,961,089 | A | * | 10/1999 | Soisnard | ...................... | 248/430 |
| 6,113,051 | A | * | 9/2000 | Moradell et al. | ............ | 248/430 |
| 6,354,553 | B1 | * | 3/2002 | Lagerweij et al. | .......... | 248/430 |
| 6,427,962 | B1 | * | 8/2002 | Rohee et al. | ................ | 248/424 |
| 6,572,066 | B1 | * | 6/2003 | Paisley et al. | .............. | 248/429 |
| 6,648,292 | B2 | * | 11/2003 | Flick et al. | .................. | 248/430 |
| 6,742,753 | B2 | * | 6/2004 | Klahold et al. | ............. | 248/429 |
| 6,761,407 | B1 | * | 7/2004 | Goodbred | ................ | 297/344.1 |
| 6,767,029 | B2 | * | 7/2004 | Jaudouin et al. | ............ | 280/735 |

* cited by examiner

Primary Examiner—Leslie A. Braun
Assistant Examiner—Steven Marsh
(74) Attorney, Agent, or Firm—Schmeiser, Olsen & Watts LLP

(57) ABSTRACT

Disclosed herein is a seat track for vehicles. The fixed rail includes a horizontal bottom fixed piece, a pair of first and second grooves formed by bending both side portions of the fixed piece at a right angle and rounding a center portion of each of the resulting vertical bent portions to have an outwardly convex semi-circular form for allowing balls to be inserted therein, a first end piece formed by downwardly bending a vertical end portion of the second groove by an acute angle, a vertical piece extending upwardly from an upper end of the first groove by a relatively long length, and a second end piece formed by twice bending an upper end portion of the vertical piece at a right angle.

3 Claims, 6 Drawing Sheets

SEAT TRACK FOR VEHICLES

BACKGROUND OF THE INVENTION

1. Field of the Invention

The present invention relates to a seat track for vehicles, and more particularly to a seat track comprising a fixed rail, and a movable rail used to move a seat back and forth, which have a structure of enabling a pin type locking device to be mounted thereto, thereby increasing resistance to shock applied from the front or rear side thereof, and of eliminating a bead forming process, which was inevitably performed in the prior art, thereby improving workability, resulting in a minimization of manufacturing costs.

2. Description of the Related Art

In general, seats for vehicles are configured to move back and forth within a predetermined extent in order to secure optimum ride comfort of drivers and passengers. With such configuration of seats, especially, drivers can adjust the position of their seats on the basis of his/her body size, thereby enabling to operate a steering wheel or pedal in the most comfortable sitting posture.

Referring to FIGS. 4 and 5 illustrating a conventional seat track, it comprises a fixed rail 100, a movable rail 200, and a plurality of rollers or balls 300. The fixed rail 100 is fastened to the bottom plane of a vehicle body by using bolts so as not to move, and the movable rail 200 is fitted into the fixed rail 100 so that it is positioned in the upper portion of the fixed rail 100 and adapted to move back and forth in a state wherein a seat for a vehicle is mounted on the upper surface thereof. Between the fixed rail 100 and movable rail 200 there are provided the balls 300 for allowing the movable rail 200 to smoothly move relative to the fixed rail 100 in a state wherein they face each other.

The fixed rail 100 of the conventional seat track comprises a horizontal bottom fixed piece 110, a pair of vertical pieces 120 formed by upwardly bending both side portions of the fixed piece 110 at a right angle, a pair of grooves 130 formed by rounding the center portion of each of the vertical pieces 120 to have an outwardly convex semi-circular form for allowing the balls 300 to be inserted therein, and a pair of U-shaped end pieces 140 formed by downwardly bending the end portion of each of the vertical pieces 120 at a right angle to have a reversed U-shaped form. The fixed piece 110 is centrally formed at one side thereof with a bead portion 111 as an upwardly protruded portion, and in turn, a plurality of fitting holes 112 are formed along a center axis of the bead portion 111 so that they are spaced apart from one another by constant distances.

The movable rail 200 of the conventional seat track comprises a seat mounting portion 210, a pair of vertical walls 220 formed by downwardly bending both side portions of the seat mounting portion 210 at a right angle, a pair of grooves 230 formed by upwardly bending the end portion of each of the vertical walls 220 so as to have a U-shaped form and rounding the center of the bent portion for allowing the balls 300 to be inserted therein at the same position as the grooves 130 of the fixed rail 100, and a pair of flanges 240 formed as vertical edge regions of the grooves 230. The seat mounting portion 210 has a width slightly narrower than that of the fixed piece 110 of the fixed rail 100, and is coupled at the upper surface thereof to a seat.

The balls 300 are inserted in both spaces defined by the grooves 130 of the fixed rail 100 and the grooves 230 of the movable rail 200 as stated above, thereby serving to enable the movable rail 200 to move inside the fixed rail 100 in a point-contact manner.

Now, considering the operation of the conventional seat track configured as stated above, first, it is assembled between the bottom plane of a vehicle body and a seat as fastening bolts extending downward from the fixed rail 100 are screwed into the bottom plane of the vehicle body, and the seat is mounted to the upper surface of the movable rail 200. In such an assembled state, when it is desired to move the seat back and forth, as a lever 400 as shown in FIG. 6 is raised so as to allow a latch 420 connected thereto to rotate about a hinge owing to the action of an elastic piece 410, locking protrusions formed at the latch 420 are released from the fitting holes 112 formed at the head portion 111 of the fixed rail 100, thereby allowing the movable rail 200 to be separated from the fixed rail 100. In this separated state, the movable rail 200, which still comes into point contact with the fixed rail 100 by means of the balls 300 inserted in both the spaces between the grooves 130 and 230, moves inside the fixed rail 100 in a sliding manner as a driver or passenger tries to move the seat back and forth on the basis of his/her body size. Then, as the driver or passenger releases the lever 400 at a time when the seat reaches a desired position, the latch 420 rotates downward about the hinge owing to the elastic force of the elastic piece 410, thereby causing the locking protrusions of the latch 420 to be fitted into the fitting holes 112 of the bead portion 111. As a result, the movable rail 200 is fixed inside the fixed rail 100 so as not to move, thus the seat coupled to the movable rail 200 is firmly fixed so as not to move.

The conventional seat track as stated above, however, has a weak point in the locking structure thereof. That is, when any shock is applied to a vehicle from the front or rear-end thereof in case of rear-end or head-on collision, the seat fluctuates due to the shock, thereby being moved back and forth to some extent. As a result, the locking protrusions fitted in the fitting holes 112 formed at the bead portion 111 of the fixed rail 100 are unintentionally released therefrom, resulting in a failure in locking between the fixed rail 100 and the movable rail 200.

Further, since the fixed rail 100 of the seat track is installed on the bottom plane of a vehicle body within a restricted narrow range, the bead portion 111, which must be formed at the fixed rail 100, has a restriction in the overall size thereof, and thus the size and thickness of the locking protrusions to be fitted into the fitting holes 112 of the bead portion 111 should be selected within a restricted range. This results in a deterioration in locking strength.

Furthermore, due to the fact that the bead portion 111 having locking protrusion fitting holes 112 is provided at the fixed rail 100, the manufacture of the fixed rail 100 is inevitably complicated due to the addition of a bead forming process, resulting in a deterioration of workability.

SUMMARY OF THE INVENTION

Therefore, the present invention has been made in view of the above problems, and it is an object of the present invention to provide a seat track for vehicles, which is configured in such a fashion that a fixed rail and a movable rail thereof come into point contact with each other by means of balls during their relative movements, thereby achieving a reduction in a frictional force between their facing surfaces, and further configured in such a fashion that a movable rail used to move a seat back and forth, and a fixed rail thereof have a structure of enabling a pin type locking device to be mounted thereto, thereby increasing resistance to shock applied from the front or rear side of the seat track, and of eliminating a bead forming process, thereby improving workability and consequently resulting in a minimization of manufacturing costs.

In accordance with the present invention, the above and other objects can be accomplished by the provision of a seat track for vehicles, comprising: a fixed rail having a horizontal bottom fixed piece, a pair of first and second grooves formed by bending both side portions of the fixed piece at a right angle and rounding a center portion of each of the resulting vertical bent portions to have an outwardly convex semi-circular form for allowing balls to be inserted therein, a first end piece formed by downwardly bending a vertical end portion of the second groove by an acute angle, a vertical piece extending upwardly from an upper end of the first groove by a relatively long length, and a second end piece formed by twice bending an upper end portion of the vertical piece at a right angle; a movable rail having a seat mounting portion, which has a width slightly narrower than that of the fixed piece of the fixed rail and is coupled at an upper surface thereof to a seat, a pair of first and second vertical walls formed by downwardly bending both side portions of the seat mounting portion at a right angle, first and second grooves formed by bending an end portion of each of the vertical walls so as to form a U-shaped portion and rounding the resulting bent portion to have an inwardly convex semi-circular form for allowing the balls to be inserted therein at the same position as the first grooves of the fixed rail, and a vertical piece extending upwardly from an upper end of the first groove; and the balls inserted in spaces defined between the grooves of the fixed rail and movable rail, the balls serving to enable the movable rail to move inside the fixed rail while coming into point contact with the fixed rail.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
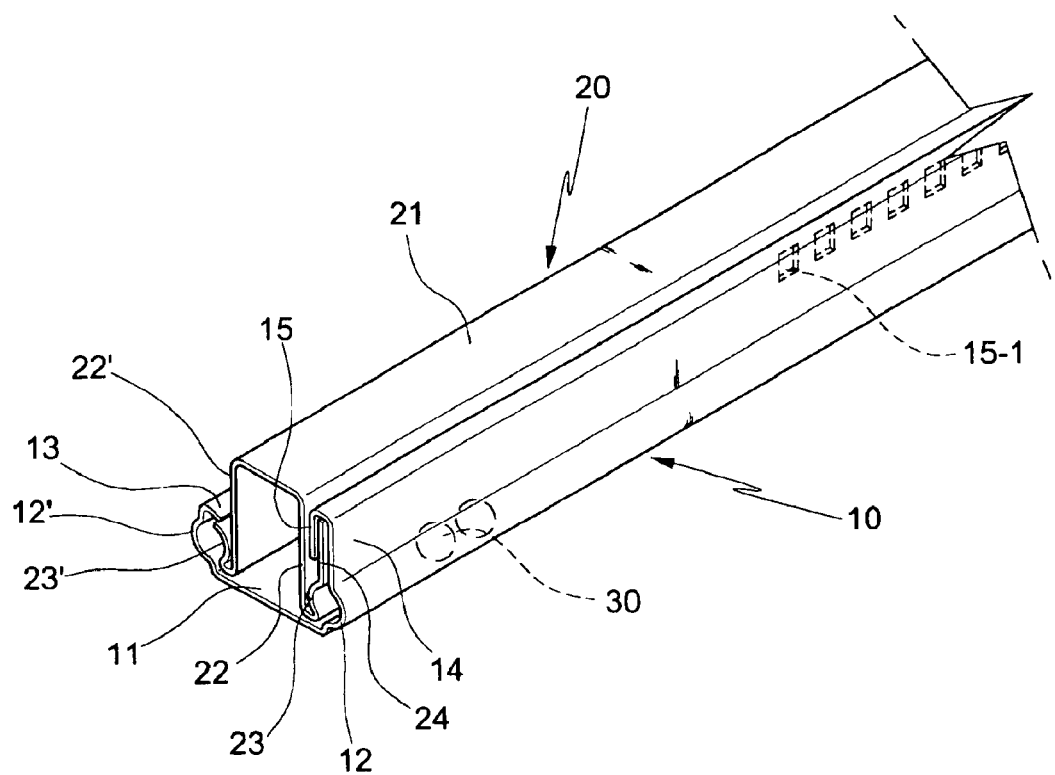
FIG. 1 is a perspective view illustrating a part of a seat track in accordance with the present invention, in a state wherein a movable rail and a fixed rail thereof are coupled to each other.
Figure 2:
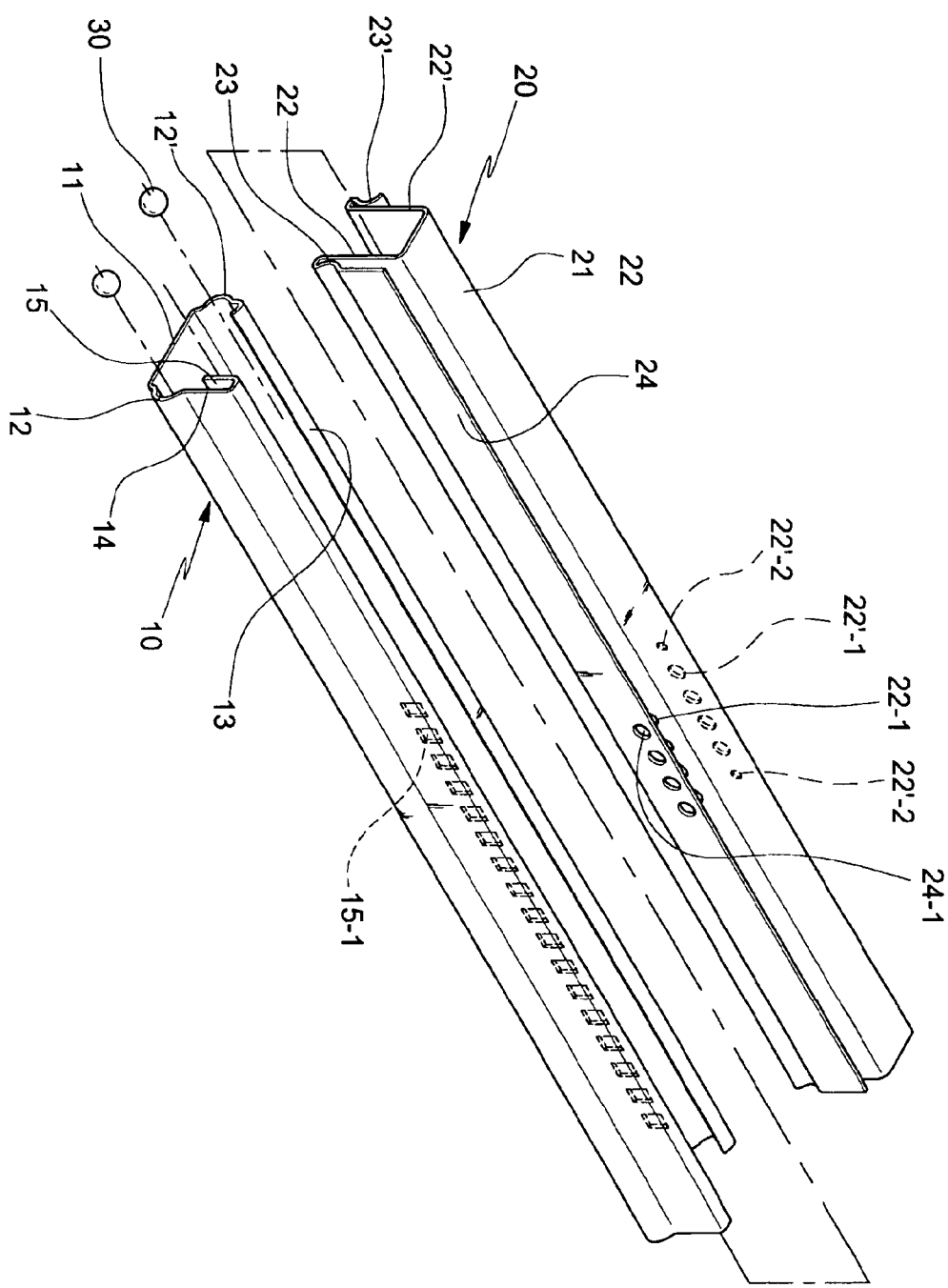
FIG. 2 is a perspective view illustrating the seat track of the present invention, in a state wherein the movable rail and fixed rail are separated from each other.
Figure 3:
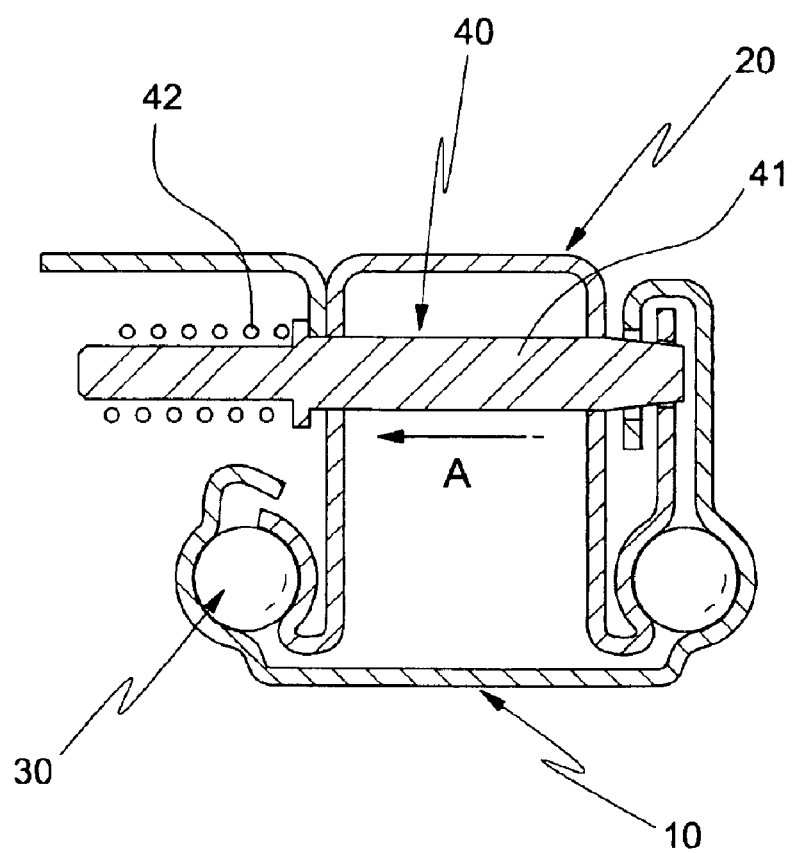
FIG. 3 is a sectional view illustrating a coupled state of the seat track in accordance with the present invention.
Figure 4:
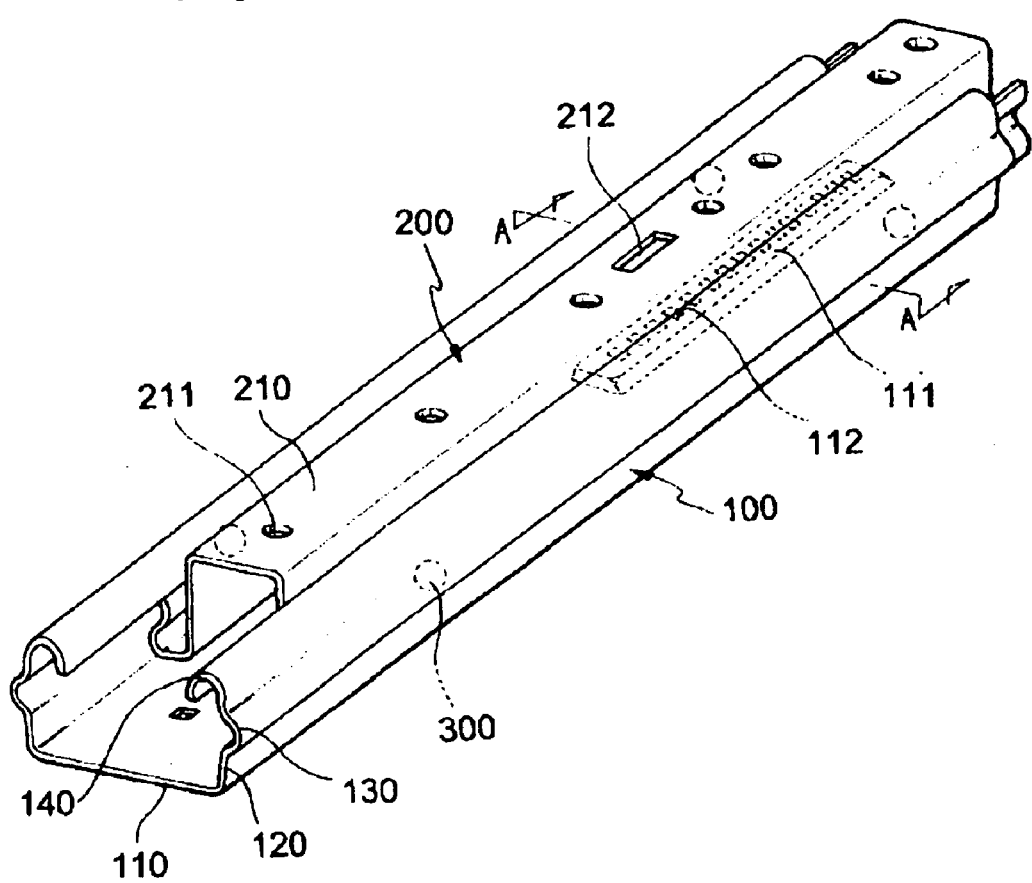
FIG. 4 is a perspective view of a conventional seat track, equivalent to FIG. 1.
Figure 5:
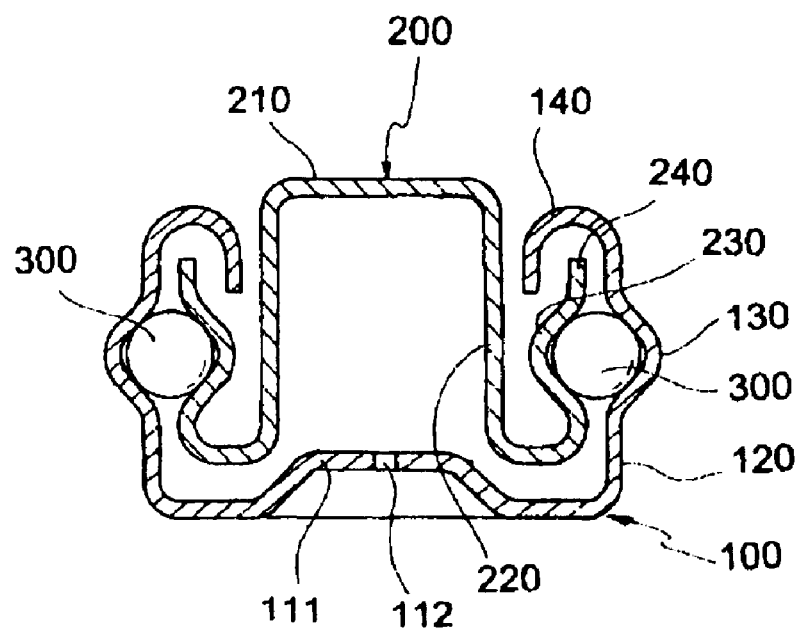
FIG. 5 is a sectional view of the conventional seat track, equivalent to FIG. 3.
Figure 6:
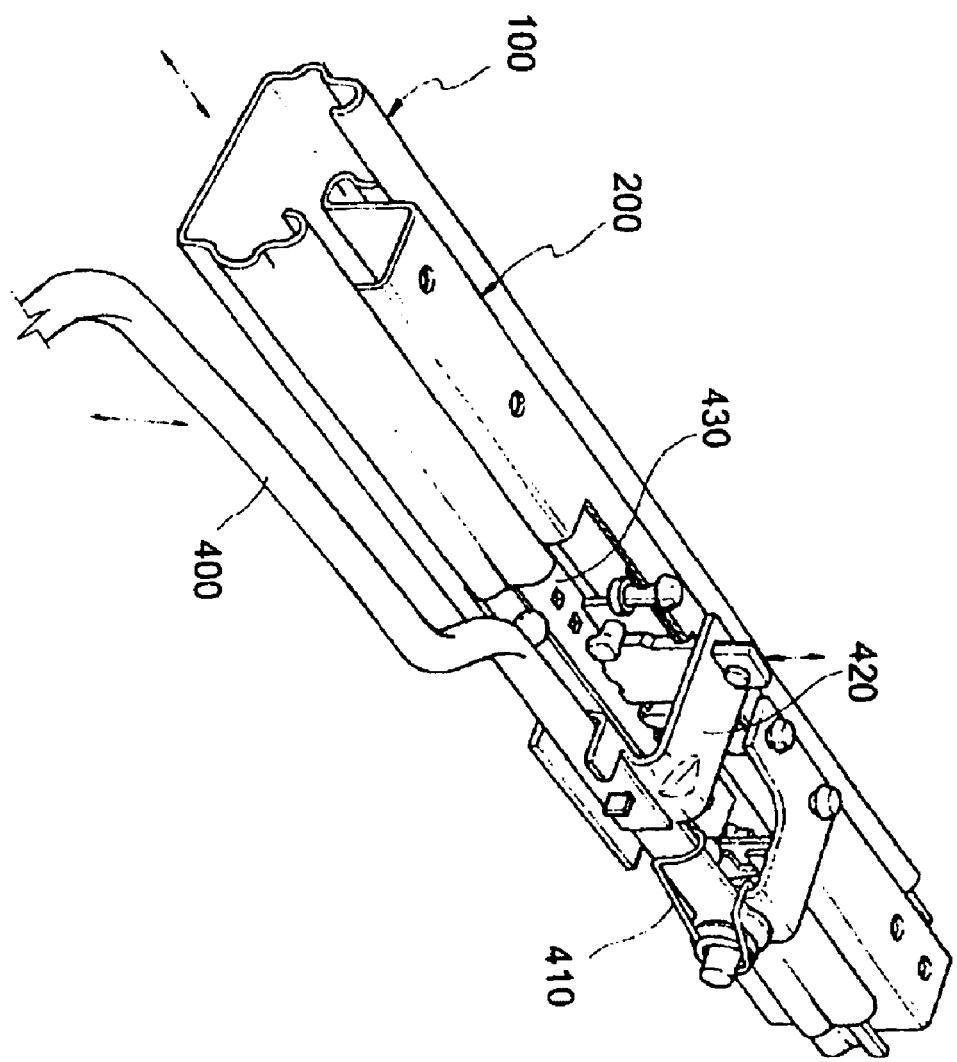
FIG. 6 is a perspective view illustrating an important portion of the conventional seat track art mounted thereto with a conventional locking device, wherein some portions are partially cut away for clarity.

FIG. 1 is a perspective view illustrating a part of a seat track in accordance with the present invention, in a state wherein a movable rail and a fixed rail thereof are coupled to each other. FIG. 2 is a perspective view illustrating the seat track of the present invention, in a state wherein the movable rail and fixed rail are separated from each other. FIG. 3 is a sectional view illustrating a coupled state of the seat track of the present invention. As shown in FIGS. 1 to 3, the seat track of the present invention basically comprises a fixed rail 10, a movable rail 20, and a plurality of balls 30. The fixed rail 10 is fastened to the bottom plane of a vehicle body by using bolts so as not to move. The movable rail 20 is fitted in the fixed rail 10 while being positioned in the upper portion of the fixed rail 10. The movable rail 20 is adapted to move back and forth in a state wherein a seat for a vehicle is mounted on the upper surface thereof. The balls 30 are located between the fixed rail 10 and movable rail 20, thereby serving to allow the movable rail 20 to smoothly move relative to the fixed rail 10 in a state wherein they face each other.

More particularly, the fixed rail 10 of the seat track comprises a horizontal bottom fixed piece 11 coming into close contact with the bottom plane, and a pair of first and second grooves 12 and 12' formed by bending both side portions of the fixed piece 11 at a right angle and rounding the center of each of the vertical bent portion to have an outwardly convex semi-circular form, thereby allowing the balls 30 to be inserted therein. The fixed rail 10 further comprises a first end piece 13 formed by downwardly bending the vertical upper end portion of the second groove 12' by an acute angle, a vertical piece 14 extending upwardly from the upper end of the first groove 12 by a relatively long length, and a second end piece 15 formed by twice bending the end portion of the vertical piece 14 at a right angle.

The movable rail 20 of the seat track comprises a seat mounting portion 21, which has a width slightly narrower than that of the fixed piece 11 of the fixed rail 10 and is coupled at the upper surface thereof to a seat, a pair of first and second vertical walls 22 and 22' formed by downwardly bending both side portions of the seat mounting portion 21 at a right angle, and a pair of first and second grooves 23 and 23', which are formed by bending the end portion of each of the vertical walls 22 and 22' so as to form a U-shaped portion and rounding the bent portion to have an inwardly convex semi-circular form, thereby allowing the balls 30 to be inserted therein at the same position as the grooves 12 and 12' of the fixed rail 10. Further, the movable rail 20 further comprises a vertical piece 24 extending upwardly from the upper end of the first groove 23.

The balls 30 are inserted in spaces defined between the grooves 12 and 22, and between the grooves 12' and 22' of the fixed rail 10 and movable rail 20, thereby serving to enable the movable rail 20 to smoothly move inside the fixed rail 10.

As shown in FIG. 1, the second end piece 15 of the fixed rail 10 is formed along at least part of its length with a plurality of locking pin fitting holes 15-1, which are spaced apart from one another at constant distances. Through these locking pin fitting holes 15-1, locking pins 41 of a pin type locking device 40 penetrate laterally so as to be locked therethrough. The number of the locking pin fitting holes 15-1, that is, the overall length where the fitting holes 15-1 are formed, denotes a maximum distance that the movable rail 20 can move inside the fixed rail 10.

In case of the movable rail 20, at the second wall 22' of the movable rail 20 are formed four locking pin fitting holes 22'-1, through which the locking pins 41 of the locking device 40 penetrate laterally, and two locking device fixing holes 22'-2 located, respectively, at both sides of the fitting holes 22'-1. Further, at the first wall 22 of the movable rail 20 are formed four locking pin fitting holes 22-1 at the same positions as the locking pin fitting holes 22'-1 of the second wall 22'. In the same manner, the vertical piece 24 is formed with four locking pin fitting holes 24-1 at the same positions as the locking pin fitting holes 22-1 and 22'-1. With this configuration, the locking pins 41 of the locking device 40 can penetrate through the locking pin fitting holes 22'-1, 22-1 and 24-1.

As can be seen from the above description, the pin type locking device 40 according to the present invention is adapted to lock or unlock the fixed rail 10 and movable rail 20 of the seat track by utilizing both side spaces of the movable and fixed rails 10 and 20. This results in a more strong locking strength, compared with a conventional locking device configured to be locked to the bottom of a conventional seat track. Therefore, according to the present invention, the movable rail 20 of the seat track can be maintained in the fixed rail 10 in a firmly coupled state.

Further, according to the present invention, by virtue of the fact that the fixed rail 10 and movable rail 20 are configured so that their coupling arrangements, namely, the grooves 12 and 12', and 23 and 23' and the balls 30, are located at the outermost positions as much as possible, the fixed rail 10 has a relatively wide width compared with a conventional seat track. This enables load applied from a seat coupled to the movable rail 20 to be effectively distributed, thereby preventing the seat from fluctuating to the left or right.

The operation of the seat track configured as stated above will be explained.

In a state wherein two fixed rails are spaced apart from each other at a distance corresponding to the width of a seat, each fixed rail 10 is screwed to the bottom plane of a vehicle body by using bolts, and then a seat is mounted on the movable rails 20, more particularly, to the seat mounting portion 21 of each of the movable rails 20. In this case, the movable rails 20 are previously fitted in the fixed rails 10, respectively. When it is attempted to move the seat back and forth, as shown in FIG. 3, the locking device 40 moves in the direction of an arrow A, that is, the locking pins 41, which penetrate through the fitting holes 22'-1, 22-1 and 24-1 formed at the fixed and movable rails 10 and 20 so as to lock them, move to the left of FIG. 3 until they are released from the locking pin fitting holes 15-1 formed at the fixed rail 10, thereby causing the movable rail 20 to be separated from the fixed rail 10.

In this separated state, as a driver or passenger moves the seat back and forth on the basis of his/her body size, the movable rail 20 moves relative to the fixed rail 10 in a sliding manner in a state wherein it still comes into point contact with the fixed rail 10 by means of the balls 30, which are inserted between the grooves 12 and 23', and 12' and 23'. Then, when it is attempted to lock the locking device 40 to the fixed rail 10 and movable rail 20 at a time when the seat reaches to a desired position, the locking pins 41 of the locking device 40 are returned to their initial locked positions owing to the elastic force of springs 42, thereby allowing the movable rail 20 to be coupled to the fixed rail 10 so as not to move. That is, the seat coupled to the movable rail 20 is firmly fixed so as not to move.

Since the pin type locking device 40 creates a relatively strong locking strength by virtue of the fact that it is applied laterally to the seat track, the seat track of the present invention can provide enhanced stability and ride comfort to the driver or passenger.

As apparent from the above description, the present invention provides a seat track for vehicles, which is configured in such a fashion that a fixed rail and a movable rail thereof come into point contact with each other by means of balls during their relative movements, thereby achieving a reduction in a frictional force between their facing surfaces, and further configured in such a fashion that the movable rail used to move a seat back and forth, and the fixed rail thereof have a structure of enabling a pin type locking device to be mounted thereto, thereby increasing resistance to shock applied from the front or rear side of the seat track, and providing enhanced stability and ride comfort to a driver or passenger. Furthermore, according to the present invention, the seat track does not require a bead forming process, which was inevitably performed in the prior art, thereby improving workability, resulting in a minimization of manufacturing costs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A seat track for vehicles, comprising:

a fixed rail having a horizontal bottom fixed piece, a pair of first and second grooves formed by bending both side portions of the fixed piece at a right angle and rounding a center portion of each of the resulting vertical bent portions to have an outwardly convex semi-circular form for allowing balls to be inserted therein, a first end piece formed by downwardly bending a vertical end portion of the second groove by an acute angle, a vertical piece extending upwardly from an upper end of the first groove by a relatively long length, and a second end piece formed by twice bending an upper end portion of the vertical piece at a right angle;

a movable rail having a seat mounting portion, which has a width slightly narrower than that of the fixed piece of the fixed rail and is coupled at an upper surface thereof to a seat, a pair of first and second vertical walls formed by downwardly bending both side portions of the seat mounting portion at a right angle, first and second grooves formed by bending an end portion of each of the vertical walls so as to form a U-shaped portion and rounding the resulting bent portion to have an inwardly convex semi-circular form for allowing the balls to be inserted therein at the same position as the first grooves of the fixed rail, and a vertical piece extending upwardly from an upper end of the first groove; and the balls inserted in spaces defined between the grooves of the fixed rail and movable rail, the balls serving to enable the movable rail to move inside the fixed rail while coming into point contact with the fixed rail.

2. The track as set forth in claim 1, wherein the second end piece of the fixed rail includes a plurality of locking pin fitting holes for allowing locking pins of a pin type locking device to laterally penetrate therethrough, the locking pin fitting holes being spaced apart from one another at constant distances.

3. The track as set forth in claim 1, wherein: the second wall of the movable rail is formed with four locking pin fitting holes for allowing locking pins of a pin type locking device to laterally penetrate therethrough, and two locking device fixing holes located, respectively, at both sides of the fitting holes for fixing the locking device;

the first wall of the movable rail is formed with four locking pin fitting holes at the same positions as the locking pin fitting holes of the second wall; and the vertical piece of the movable rail is formed with four locking pin fitting holes at the same positions as the locking pin fitting holes of the first and second walls for penetration of the locking pins.

* * * * *